United States Patent [19]

Yomoto et al.

[11] Patent Number: 4,890,245

[45] Date of Patent: Dec. 26, 1989

[54] METHOD FOR MEASURING TEMPERATURE OF SEMICONDUCTOR SUBSTRATE AND APPARATUS THEREFOR

[75] Inventors: Masahiko Yomoto, Kawasaki; Makoto Uehara, Tokyo; Hajime Ichikawa, Yokohama; Shigeru Kato, Hoya, all of Japan

[73] Assignee: Nikon Corporation, Tokyo, Japan

[21] Appl. No.: 99,297

[22] Filed: Sep. 17, 1987

[30] Foreign Application Priority Data

| Sep. 22, 1986 | [JP] | Japan | 61-224618 |
| Dec. 27, 1986 | [JP] | Japan | 61-311611 |
| Apr. 28, 1987 | [JP] | Japan | 62-105634 |

[51] Int. Cl.$^4$ .......................... G06F 15/00; G01S 5/62
[52] U.S. Cl. ................................. 364/557; 250/492.2; 356/51; 374/121
[58] Field of Search .................. 374/61, 126, 129; 437/173, 174, 8, 247; 356/51; 364/490, 357, 551.01, 571.05; 250/338.3, 492.2, 492.1

[56] References Cited

U.S. PATENT DOCUMENTS

| 3,451,254 | 6/1969 | Maley | 374/126 |
| 4,513,384 | 4/1985 | Rosencwaig | 374/7 |
| 4,568,201 | 2/1986 | Noda | 374/121 |
| 4,741,626 | 5/1988 | Hashimoto | 374/121 |
| 4,750,139 | 6/1988 | Dils | 364/557 |

FOREIGN PATENT DOCUMENTS

| 0168943 | 10/1983 | Japan | 356/51 |
| 1108478 | 3/1968 | United Kingdom | 364/557 |

OTHER PUBLICATIONS

Ehrlich et al.; "Integrated Circuit Wafer Temperature Detector", IBM Technical Disclosure; vol. 20, No. 6, Nov. 1977.

Primary Examiner—Parshotam Lall
Assistant Examiner—Ellis B. Ramirez
Attorney, Agent, or Firm—Shapiro and Shapiro

[57] ABSTRACT

An apparatus and a method for detecting the temperature of a substrate, and for controlling the radiation-annealing of the substrate, for example, measures the intensity of infrared light from the substrate when the substrate is irradiated by measuring infrared light and also when the substrate is not irradiated by the infrared light. The temperature is calculated from the transmissivity and emissivity of the substrate, which are calculated from the intensity measurements.

23 Claims, 8 Drawing Sheets

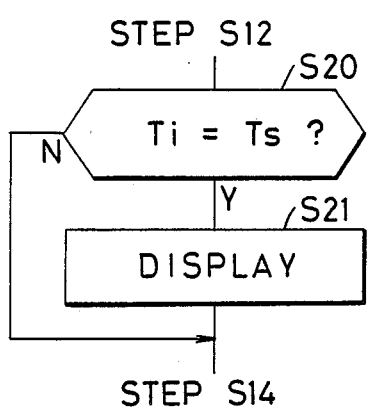
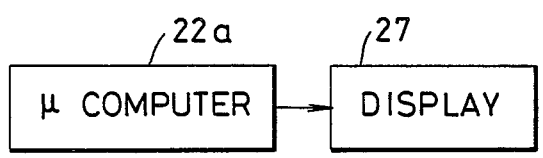
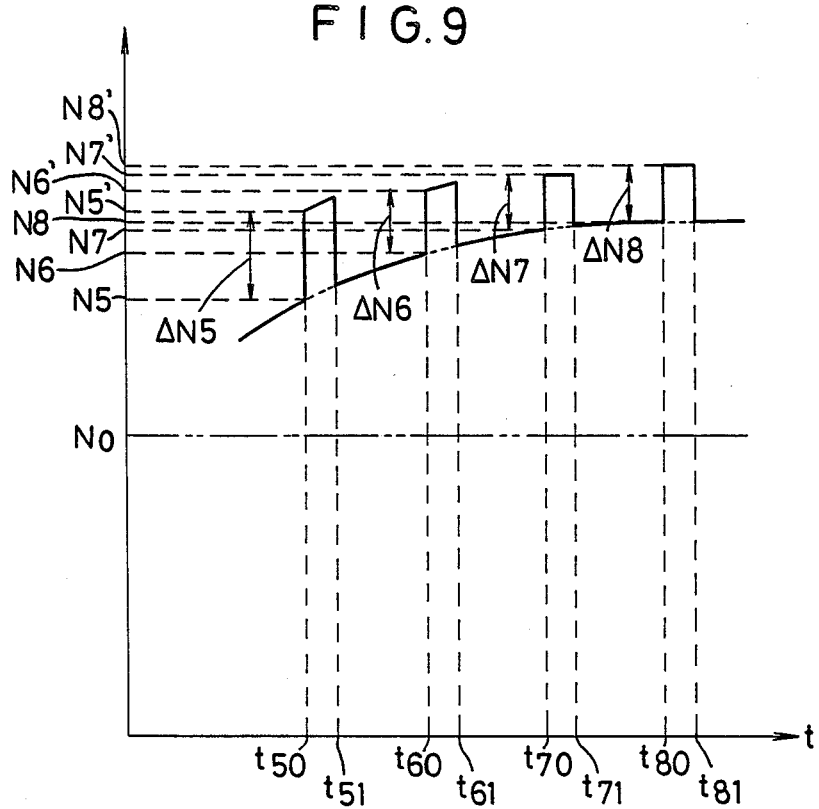

F I G.10
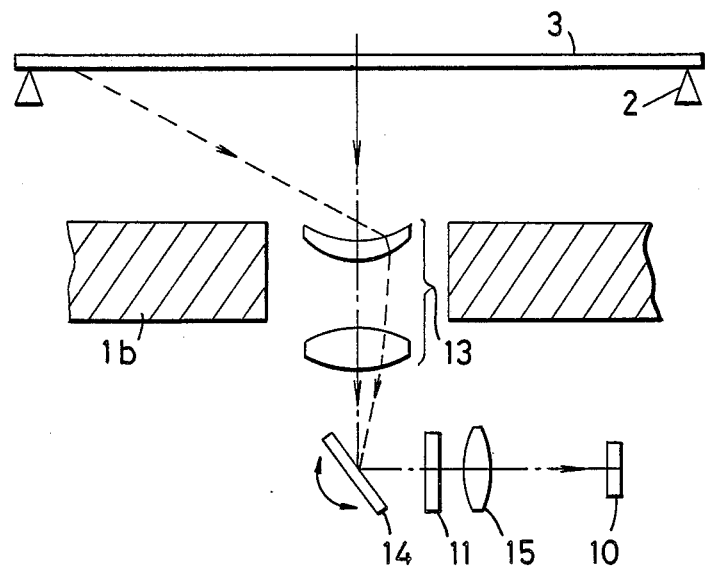
F I G.11
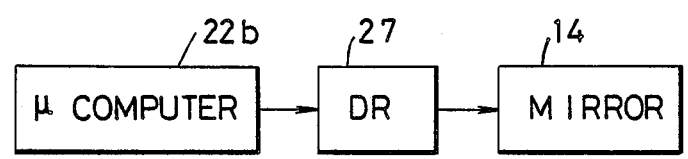

METHOD FOR MEASURING TEMPERATURE OF SEMICONDUCTOR SUBSTRATE AND APPARATUS THEREFOR

BACKGROUND OF THE INVENTION

1. Field of the Invention

The present invention relates to a temperature measuring method for measuring the temperature of an infrared-transmitting semiconductor substrate such as a silicon substrate with a radiation thermometer, and an apparatus therefor.

2. Related Background Art

In the manufacturing process of semiconductor devices such as IC chips, it is necessary to anneal a semiconductor substrate such as a silicon substrate after ion implantation thereto With the recent use of heating apparatus capable of annealing within a period of several tens of seconds with radiation, in order to prevent diffusion of impurities, it is required to measure the substrate temperature within a short time and to control the heating temperature For this purpose, the temperature has been determined by:

(1) measurement with a thermocouple; or (2) measurement of the spectral radiation of the substrate with a radiation thermometer and calculation with the known Planck's equation based on the measured radiation and the emissivity of the substrate measured in advance.

However the method (1) is associated with the drawbacks of eventual contamination caused by the mounting of the thermocouple on the surface of the substrate, and of difference between the surface temperature of the substrate and temperature measured by the thermocouple.

Also the method (2) is incapable of precise temperature measurement, because the emissivity varies from substrate to substrate according to the doping concentration thereof, and also varies with the rise in temperature of the substrate. For example, in case of a silicon substrate, the emissivity in the middle infrared range at normal temperature is almost zero for a low doping concentration, but reaches 0.5 or even higher at a high doping concentration. Also the emissivity increases rapidly with the rise in temperature of the substrate.

SUMMARY OF THE INVENTION

The object of the present invention is to provide a method of measuring the temperature of a semiconductor substrate by irradiating said substrate with a radiation different from the radiation for annealing of the substrate and measuring the transmittance of said substrate, and an apparatus therefor.

BRIEF DESCRIPTION OF THE DRAWINGS

FIG. 7 is a block diagram showing a part of a second embodiment of the present invention;

FIG. 8 is a flow chart showing a part of the function of the second embodiment;

FIG. 9 is a chart showing the time-dependent change in the output of a radiation thermometer;

FIG. 10 is a partial schematic view of a third embodiment of the present invention;

FIG. 11 is a block diagram showing a part of the third embodiment;

DETAILED DESCRIPTION OF THE PREFERRED EMBODIMENTS

Figure 1A:
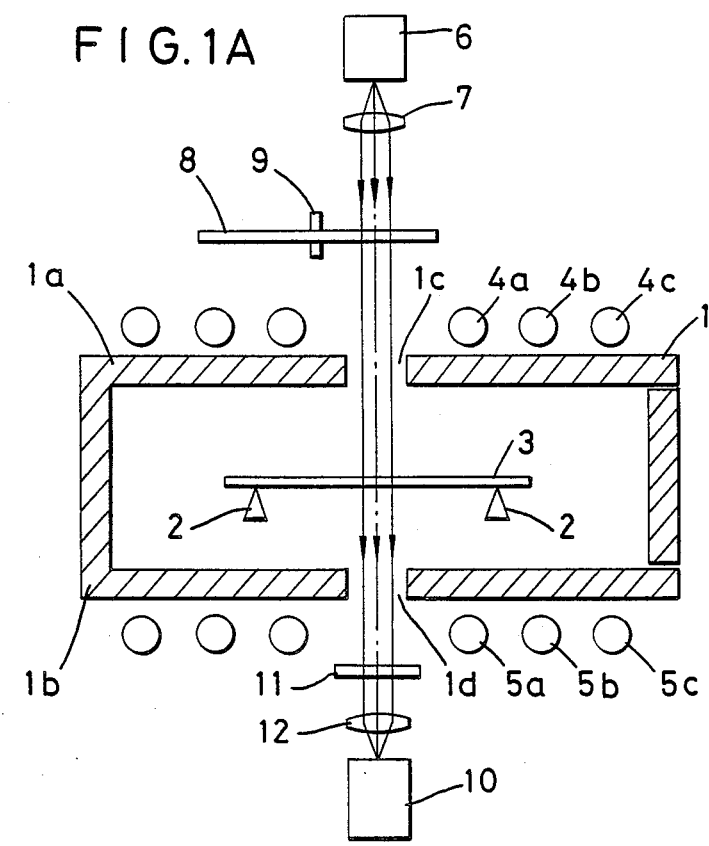
FIG. 1A is a schematic view of a first embodiment of the present invention.

In the following there will be explained the principle of measurement of semiconductor substrate temperature with a radiation thermometer, and the infrared light used for irradiating the semiconductor substrate.

The spectral luminance $N(\lambda, T)$ of a substrate measured with a radiation thermometer can be written as:

$$N(\lambda, T) = \epsilon\lambda(T) \cdot W\lambda(T) \tag{1}$$

wherein $\epsilon\lambda(T)$: emissivity of substrate $W\lambda(T)$: spectral luminance of a black body.

The spectral luminance of black body $W\lambda(T)$ can be written as:

$$W\lambda(T) = \frac{1}{\pi} \cdot \frac{C_1}{\lambda^5} \frac{1}{\exp(C_2/\lambda \cdot T) - 1} \tag{2}$$

wherein $C_1, C_2$: constants $\lambda$: wavelength of radiation $T$: temperature of black body Thus, if the emissivity $\epsilon\lambda(T)$ of the substrate is given, the equation (1) can determine the spectral luminance $W\lambda(T)$ of a black body, based on $N(\lambda, T)$ determined from the measured value of the radiation thermometer, and the equation (2) can determine the black body temperature T which corresponds to the temperature of the substrate.

The emissivity $\epsilon\lambda(T)$ of the substrate can be represented as:

$$\epsilon\lambda(T) = 1 - \{\tau\lambda(T) + \rho\lambda(T)\} \tag{3}$$

wherein:

$\epsilon\lambda(T)$: emissivity of substrate $\rho\lambda(T)$: reflectance of substrate $\tau\lambda(T)$: transmissivity of substrate.

$\rho\lambda(T)$ is a specific value related to the refractive index of the substrate and is almost constant, scarcely affected by the doping concentration. Consequently if $\tau\lambda(T)$ is measured on a substrate to be measured, it is easily possible to determine $\epsilon\lambda(T)$ from the equation (3) and to obtain the substrate temperature as explained above.

In the present invention, therefore, the intensity of radiation from a semiconductor substrate when it is irradiated with measuring radiation of a predetermined intensity or higher is measured; then the intensity of radiation from said substrate when it is not irradiated with said measuring radiation, or of radiation from an area of said substrate not irradiated with said measuring radiation is measured; and the temperature of the semiconductor substrate is calculated from the difference of the measured intensities.

The foregoing equation (3) does not include the multiple reflection inside the substrate. If such multiple reflection is considered, the emissivity $\epsilon\lambda(T)$ can be written as:

$$\epsilon\lambda(T) = 1 - \{\tau\lambda^*(T) + \rho\lambda^*(T)\} \qquad (3')$$

wherein:

$$\epsilon\lambda(T) = 1 - \{\tau\lambda^*(T) + \rho\lambda^*(T)\} \qquad (3')$$

wherein:

$$\tau\lambda^*(T) = \tau\lambda(T) \frac{\{1 - \rho\lambda(T)\}^2}{1 - \rho\lambda^2(T)\tau\lambda^2(T)} \qquad (4)$$

$$\rho\lambda^*(T) = \rho\lambda(T)\left(1 + \frac{\tau\lambda^2(T)[1 - \rho\lambda(T)]^2}{1 - \rho\lambda^2(T)\tau\lambda^2(T)}\right) \qquad (5)$$

$\tau\lambda^*(T)$ : transmissivity including multiple $\tau\lambda^*(T)$: transmissivity including a multiple reflection
$\tau\lambda(T)$: transmissivity without multiple reflection
$\rho\lambda^*(T)$: reflectance including multiple reflection
$\rho\lambda(T)$: reflectance without multiple reflection.

$\tau\lambda^*(T)$ in the equation (4) is an amount which can be determined from the above-mentioned difference of the measured intensities, and $\rho\lambda(T)$ is a value specific to the semiconductor substrate, so that $\tau\lambda(T)$ can be obtained from the equation (4). These values $\tau\lambda(T)$ and $\rho\lambda(T)$ are introduced into the equation (5) to determine $\rho\lambda^*(T)$, so that the emissivity $\epsilon\lambda(T)$ including the multiple reflection can be determined from the equation (3').

EMBODIMENTS

Figure 1B:
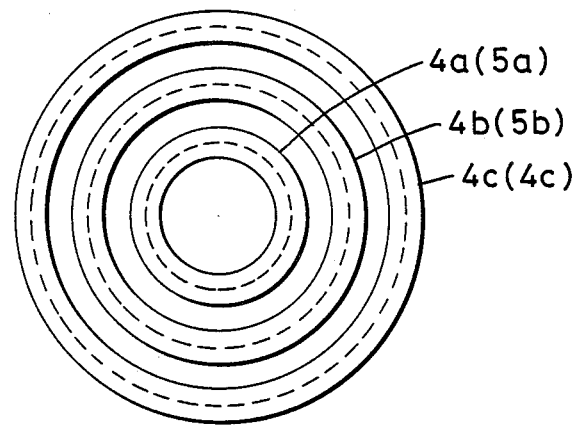
FIG. 1B is a plan view of a lamp employed in the first embodiment of the present invention.

Referring to FIG. 1A, a semiconductor substrate 3 is placed on a support 2 positioned in a chamber 1. On the upper wall 1a and lower wall 1b of the chamber 1, there are provided six infrared heating lamps 4a, 4b, 4c, 5a, 5b, 5c of different radii arranged concentrically as shown in FIG. 1B for heating said substrate 3. The upper and lower walls 1a, 1b are provided, at the centers thereof, with apertures 1c, 1d, above which is provided a measuring infrared lamp 6 of a wavelength different from that of the infrared light from the heating infrared lamps 4a-4c, 5a-5c. The light from lamp 6 is converted into a parallel beam with a lens 7, and a chopper 8 for opening or closing the light path of the parallel beam is rotatably supported by a shaft 9 and is driven by a driving device. Opposed to the measuring infrared lamp 6 there is provided a radiation thermometer 10, in front of which there are provided a filter 11 for passing a wavelength for measuring the substrate temperature and a lens 12 for concentrating the parallel beam.

Figure 2:
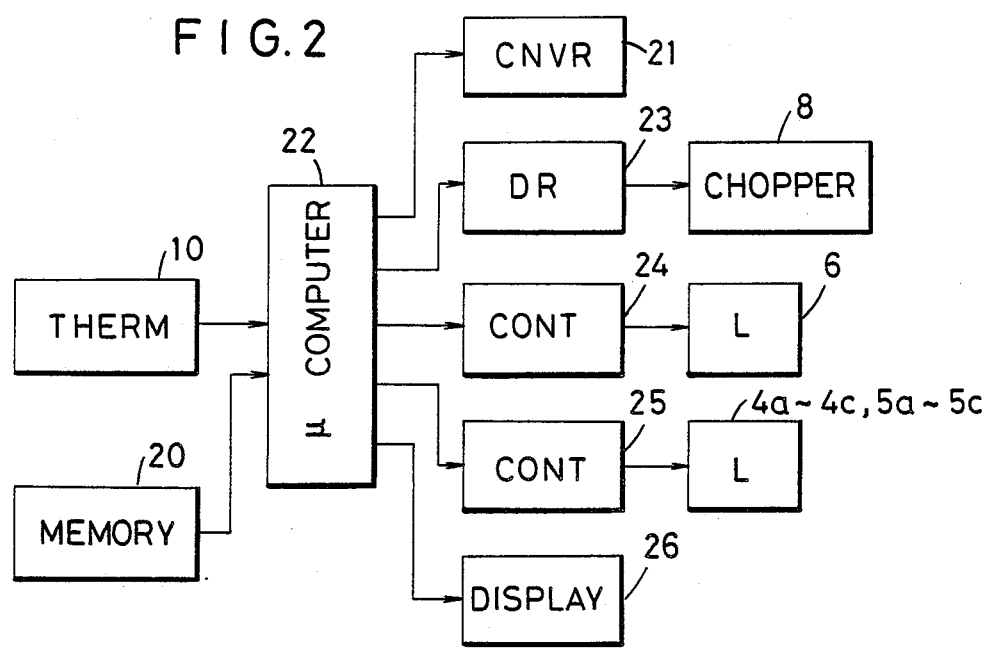
FIG. 2 is a block diagram of the first embodiment.

FIG. 2 shows a control unit of the aboveexplained apparatus, wherein the radiation thermometer 10 is connected to a microcomputer 22, which is in turn connected to a memory 20 for storing data for annealing, a wafer conveyor 21, a drive circuit 23 for the chopper 8, a drive control circuit 24 for the measuring infrared lamp 6, a drive control circuit 25 for the heating infrared lamps 4a-4c, 5a-5c, and a temperature display unit 26.

In the following there will be given an explanation of the function of the present temperature measuring apparatus, while making reference to a flow chart shown in FIG. 3 and a chart shown in FIG. 4.

At first a step S1 turns on the measuring infrared lamp 6 and resets an internal counter of the microcomputer 22 to zero. Then a step S2 measures the output $N_o$ of the radiation thermometer 10 indicating the intensity of the infrared light from the infrared lamp 6 while the substrate 3 is not placed on the support 2, and stores data $N_o$ in a RAM constituting the internal memory of the microcomputer 22. The intensity of the light from the measuring infrared lamp 6 is so controlled as to be constant at least during the measurement by the control circuit 24. Then the internal counter of the microcomputer 22 is stepped up to "1". Then a step S3 causes the conveyor 21 to convey a wafer or substrate into the chamber 1.

A step S4 activates the lamps 4a-4c, 5a-5c to heat the substrate 3. Then a step S5 activates the chopper drive circuit 23 to close the light path of the measuring infrared light by the chopper 8. The light emerging from the infrared lamp 6, converted into a parallel beam by the lens 7, is intercepted by the chopper 7 and does not reach the substrate 3. In this state, the substrate 3, being heated by the heating infrared lamps 4a-4c, 5a-5c, emits infrared light corresponding to the surface temperature of the substrate 3. The emitted infrared light is filtered by a filter 11, then condensed by the condenser lens 12, and enters the radiation thermometer 10. A step S6 stores the output $N_1$, for example in case i=1, of the radiation thermometer 10 corresponding to the spectral luminance of the substrate 3 at a time $t_{10}$ shown in FIG. 4.

Then a step S7 activates the chopper drive circuit 23 to cause the chopper 8 to open the light path of the measuring infrared light, whereby the substrate 3 is irradiated by the infrared light from the measuring infrared lamp 6. This infrared light is transmitted by the substrate 3 in a proportion dependent on the doping concentration therein, activation state of the implanted ions and temperature thereof. Thus the transmitted light and the light emitted from the substrate 3 enter the radiation thermometer 10, which produces an output $N_1'$ for i=1. In a step S8, the microcomputer 22 stores output $N_1'$ in RAM.

A subsequent step S9 determines the transmissivity $\tau_1$ at a time $t_{10}$ according to an equation:

$$(N_1' - N_1)/N_o = \tau_1 \qquad (6)$$

from the output $N_o$ measured in advance, of the radiation thermometer 10 when the infrared light from the measuring infrared lamp 6 directly enters the thermometer without passing through the substrate 3, and the above-explained data $N_1$, $N_1'$, and stores said value $\tau_1$ in the RAM of the internal memory. However, if a part of the measuring infrared light transmitted by the substrate 3 does not fall on the radiation thermometer 10 for example by the diffraction by a pattern formed on the substrate 3, a correction is needed for the value $N_1'$. Then a step S10 determines the emissivity $\epsilon_1$ from said transmissivity $\tau_1$ and a reflectance $\rho c$ determined in advance, according to the equation (3), and stores the emissivity in the RAM of the internal memory. A step S11 determines the temperature $T_1$ of the substrate 3 from emissivity $\epsilon_1$ and the output $N_1$ of the radiation thermometer 10 when the chopper 8 is closed, according to the equations (1) and (2), and stores that temperature in the RAM, and a step S12 causes the temperature display unit 26 to display temperature $T_1$. A step S14 compares the measured temperature Ti with a preset heating temperature Ts stored in advance in the RAM of the microcomputer 22, and the annealing operation may be terminated when preset temperature Ts is reached.

A step S13 reads desired data which are stored in the memory 20 and indicate the temperature change in a predetermined period for achieving ideal annealing. In the step S13, the microcomputer 22 reads the data from the memory 20 with the lapse of time from the start of annealing with the lamps 4a-4c, 5a-5c, and compares the read data with Ti calculated in the step S11, thereby controlling the electric power supplied to the lamps 4a-4c, 5a-5c. The step S14 discriminates whether the annealing has been completed, and, if not, the value of i is increased by one and the sequence returns to the step S5.

Figure 4:
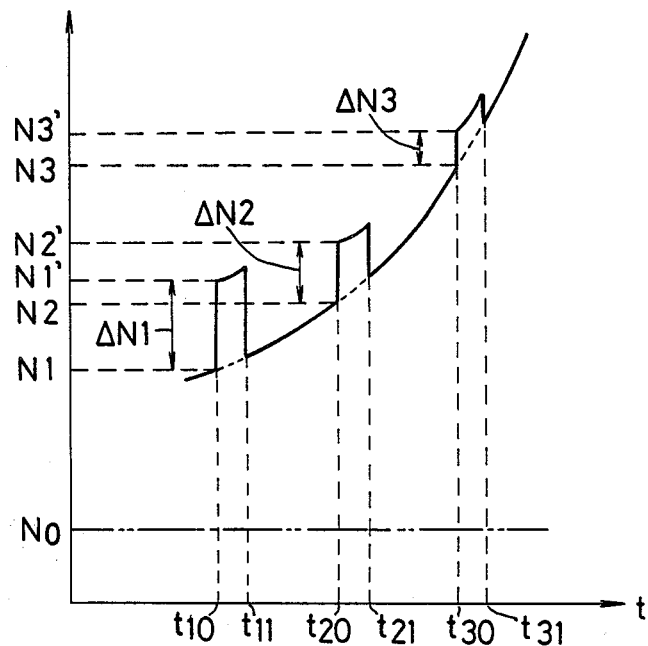
FIG. 4 is a chart showing the time-dependent change in the output of radiation thermometer.

The above-explained sequence (steps S5 to S14) is repeated at a predetermined interval, at $t_{20}$, $t_{30}$, . . . shown in FIG. 4, so that the annealing temperature of the substrate can be precisely measured on real-time basis, and the results of measurement are used for controlling the heating infrared lamps 4a-4c, 5a-5c to achieve precise temperature control.

In FIG. 4, $\Delta N_1$, $\Delta N_2$ and $\Delta N_3$ are contributions of the measuring infrared light, which decrease at a higher temperature though the intensity of the measuring infrared lamp 6 is constant. This fact indicates that the infrared transmissivity of the substrate 3 is dependent on the activation state of the implanted ions and the temperature, and the precision of measurement can be improved by the temperature measurement combined with the measurement of transmissivity $\tau$ at each timing, as in the present invention.

Instead of opening and closing the light path of the measuring infrared light by the chopper 8, it is also possible to provide a light modulator or a polarizer in the light path for controlling the intensity of the infrared light irradiating the semiconductor substrate 3. The intensity of the measuring infrared light transmitted by the substrate 3 need not necessarily be brought completely to zero, if it is of a level not significantly influencing the output of the radiation thermometer.

In the above-explained apparatus, the temperature of the substrate is determined from the real-time measurements of the emissivity of the substrate, and the heating temperature with the infrared lamps is controlled according to the data stored in the memory 20. However, if the temperature dependence of the emissivity of the substrate is already known, it is also possible to determine the transmissivity or emissivity depending on the doping concentration of the substrate at normal temperature, to store, in the memory 20, a heating curve determined from the emissivity and the temperature dependence, and to control the heating temperature according to that curve.

In the principle of the present invention in which the emissivity $\epsilon\lambda(T)$ is determined from the measured transmissivity $\tau\lambda(T)$ according to the equation (3), it is assumed that the reflectance $\rho\lambda(T)$ is constant. More strictly, however, reflectance slightly varies according to the temperature. Nevertheless, since the approximate temperature of the substrate can be predicted for example from the lighting time of the heating infrared lamps, it is possible to improve the precision of measurement by using a corrected value of the reflectance $\rho\lambda(T)$, determined in advance from the known temperature coefficient of the refractive index of the substrate. Though the reflectance $\rho\lambda(T)$ is not significantly dependent on the doping concentration, the dependence tends to increase at a longer wavelength, so that the precision of measurement becomes deteriorated if the measuring infrared light is brought to an excessively long wavelength. On the other hand, in order to improve the precision of measurement, it is essential to separate the wavelength range of the measuring infrared light from that of the heating infrared light, so that the wavelength of the former cannot be made very short. In practive, therefore, it is desirable to use the measuring infrared light with a wavelength of ca. $5\mu$, and the heating infrared light with a wavelength of $4\mu$ or shorter, capable of passing through the quartz chamber.

Also the present invention is not limited to application in a light heating apparatus, but is applicable also to the temperature measurement in a sputtering, epitaxy or etching apparatus in which light is used for auxiliary heating of a substrate, or a photo CVD apparatus or a photodoping apparatus.

Figure 5:
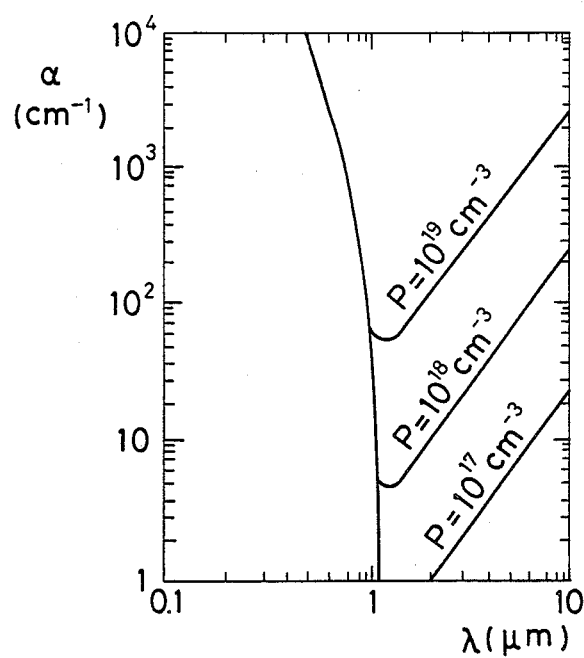
FIG. 5 is a chart showing the absorption coefficient of a substrate as a function of wavelength.

The infrared absorption of a semiconductor is known to include a fundamental absorption and a free carrier absorption. The fundamental absorption is caused by the band gap in the crystal, and occurs in a wavelength range of 1.1 $\mu$m or shorter in case of silicon as shown in FIG. 5, and the absorption coefficient $\alpha$ does not depend on the carrier concentration P in the silicon. On the other hand, the free carrier absorption principally occurs in a wavelength range of 1 $\mu$m or longer, and the absorption coefficient increases with the carrier concentration P and the wavelength. A semiconductor substrate only has the fundamental absorption in a state after the implantation of impurity ions, but activation by annealing generates free carriers including the free carrier absorption. Consequently the amount of activation of the impurity ions is closely related to the free carrier absorption.

Figure 6:
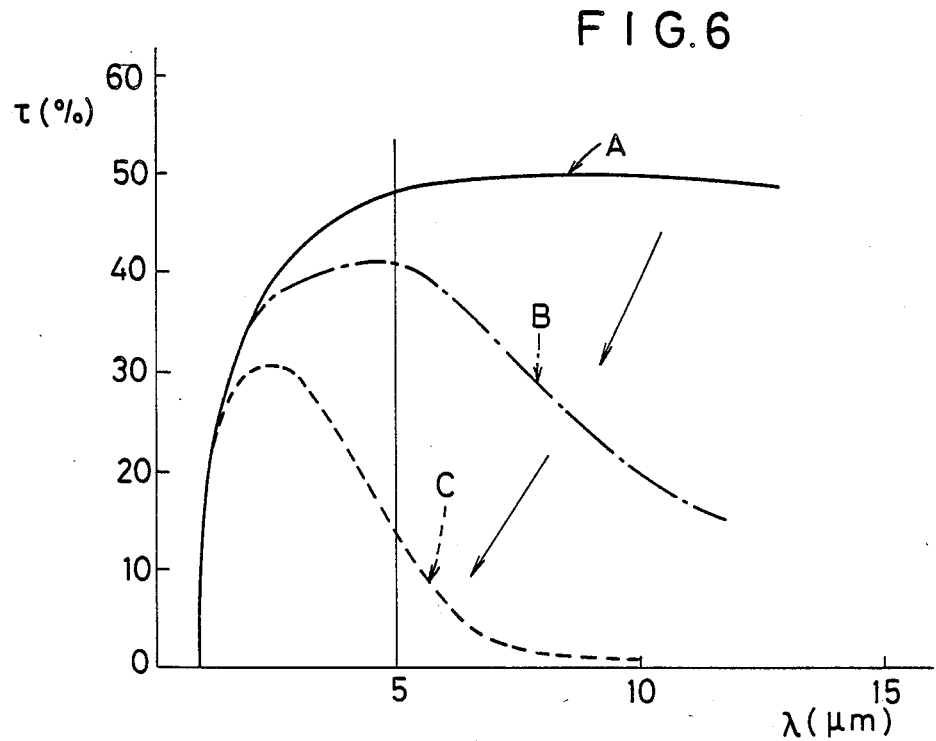
FIG. 6 is a chart showing the change in the relationship between the transmittance of substrate and the wavelength, as the result of change in the active state of impurity ions.

FIG. 6. shows the spectral transmissivity $\tau$ of a semiconductor substrate in the ordinate as a function of wavelength $\lambda$ in the abscissa, taking the activation state of the implanted impurity ions as a parameter. A solid line A shows the spectral transmissivity of a semiconductor substrate before activation, while a chain line B shows a case of activation by annealing to a certain extent, and a broken line C shows a case of activation by further advanced annealing. This chart indicates that an increased concentration of free carriers caused by the activation of impurity ions increases the infrared absorption coefficient, thus reducing the transmissivity.

In the following there will be explained a second embodiment based on these facts, in which the state of annealing of a substrate is identified from the amount of activation determined from the transmissivity.

FIG. 7 is a block diagram showing only an improved portion of the structure shown in FIG. 2, wherein the a blocks 10, 20-26 are connected to the microcomputer in the same manner as in the first embodiment. Blocks 8, 6, 4a–4c, 5a–5c, 10, 20–26 are omitted in the drawing, but a display unit 27 for indicating the amount of activation of the impurity is added, and the microcomputer 22 is replaced by 22a.

Figure 3:
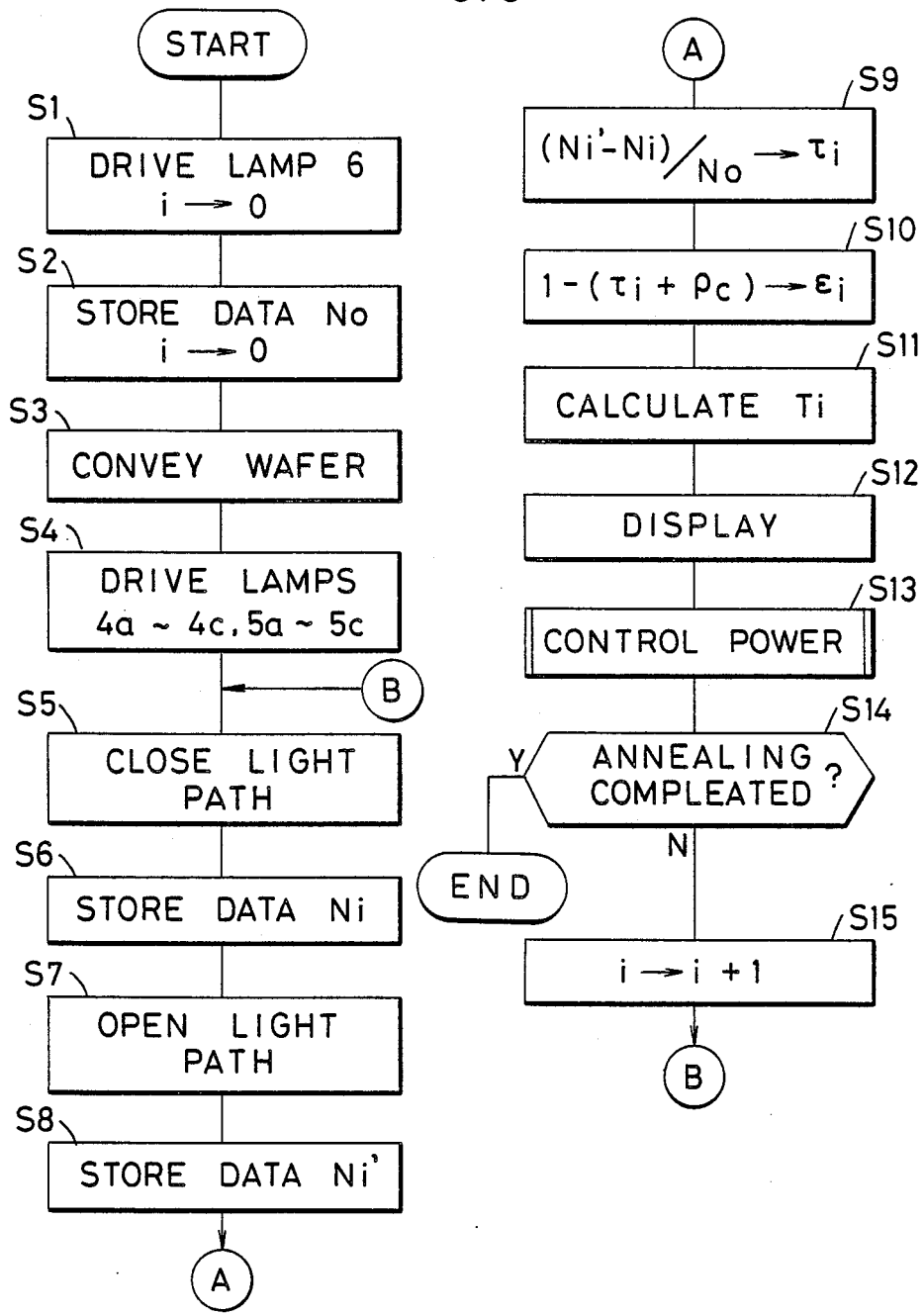
FIG. 3 is a flow chart showing the function of the first embodiment.

As shown in FIG. 8, the control sequence of the microcomputer 22a has additional steps S20, S21 in comparison with the sequence of the microcomputer 22 shown in FIG. 3.

The step S20 discriminates whether the substrate temperature is constant (Ti=Ts). If constant, the contribution of temperature to the free carrier concentration determining the transmissivity $\tau_i$, obtained in the step S9, becomes constant, so that there remains the contribution of the amount of activation of the impurity ions. Thus the step S21 converts the transmissivity $\tau_i$ into a value representing the amount of activation of the impurity ions, and causes the display unit 27 to display that value. On the other hand, if the discrimination in the S20 turns out negative, the sequence proceeds to the step S14.

The sequence of the steps S5 to S14 is repeated at a predetermined interval, at the timings $t_{10}$, $t_{20}$, $t_{30}$, ... shown in FIG. 4 in the course of heating of the substrate, or at the timings $t_{50}$, $t_{60}$, $t_{70}$, $t_{80}$, ... shown in FIG. 9 if the substrate temperature is constant. The amount of activation of the impurity ions can be precisely determined from the transmissivity $\tau_i$ determined when the substrate temperature is constant, and efficient annealing can be achieved by turning off or reducing the intensity of the heating infrared lamps 4a–4c, 5a–5c at a desired activation state. Also the annealing can be terminated when the step S14 discriminates that the amount of activation, converted from the transmissivity, has reached a desired value, or the change in the amount of activation has reached a desired value.

In FIG. 9, $N_5$, $N_6$, $N_7$ and $N_8$ are the intensities of the emission from the substrate 3, and increase in this order though the temperature of substrate 3 is constant, because the emissivity of the substrate increases with the increase in the amount of activation of the impurity ions. Also the decrease in $\Delta N_5$, $\Delta N_6$, $\Delta N_7$ and $\Delta N_8$ with the lapse of time, despite the constant intensity of the measuring infrared lamp 6, also indicates that the amount of activation of the impurity ions increases with time.

In the present embodiment, the temperature measurement including correction for emissivity of the substrate is conducted by an optical system the same as that used for detecting the state of activation, but it may also be conducted by another temperature detector such as a thermocouple. For example a thermocouple may be mounted on a dummy substrate positioned close to the substrate under processing, thereby discriminating whether the temperature of the substrate under processing is constant, or a thermocouple may be mounted on a substrate of the same kind as the processed substrate to determine a lighting condition of the heating infrared lamps for obtaining a constant substrate temperature, and the lighting condition may be used for heating the substrate to be processed.

FIG. 10 shows a part of a third embodiment of the present invention, wherein the chopper is replaced by a galvano mirror 14. In FIG. 10, the chamber 1, measuring lamp 6, heating lamps 4a–4c, 5a–5c and lens 7 are omitted for the purpose of simplicity. A measuring optical system is composed of an objective lens 13, a filter 11 and a relay lens 15. In this optical system, the galvano mirror 14 for light path switching is positioned at the exit pupil of the objective lens 13, and performs an angular scanning motion to time-sequentially guide the infrared light from various portions of the semiconductor substrate 3 to the radiation thermometer 10. In the course of the scanning motion of the galvano mirror 14, in a state where the central area of the substrate is scanned and becomes conjugate with the light receiving face of the radiation thermometer 10, there is measured a synthesized infrared light, including not only the infrared light emitted by the central area of the substrate depending on the temperature thereof but also the measuring infrared light transmitted by the substrate.

As shown in FIG. 11, the galvano mirror 14 is driven by a drive unit 27 controlled by a mirocomputer 22b, which is connected to the blocks 10, 20, 21, 23–26 shown in FIG. 2 but omitted in FIG. 11.

Figure 12:
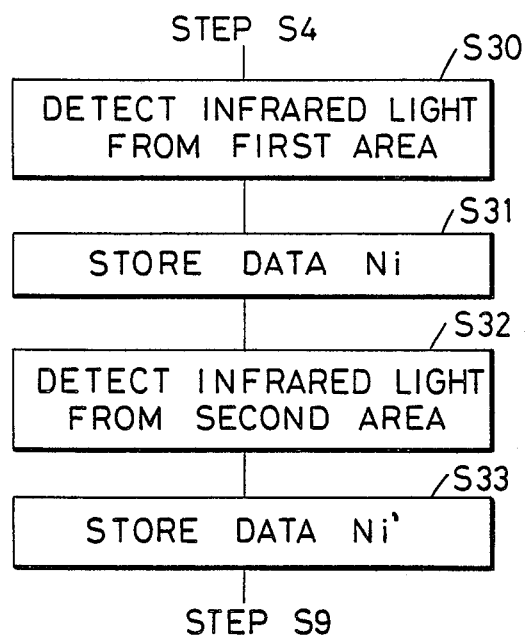
FIG. 12 is a flow chart showing a part of the function of the third embodiment.

FIG. 12 is a partial flow chart of the microcomputer 22b and replaces the steps S5–S8 in FIG. 3.

Figure 13:
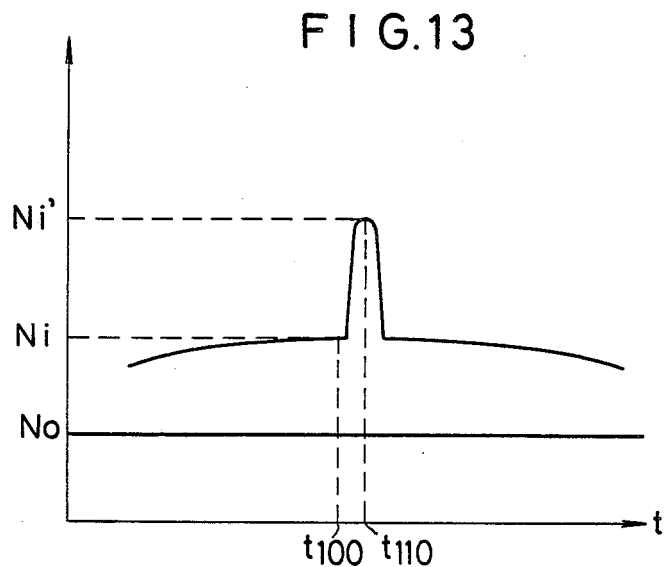
FIG. 13 is a chart showing the time-dependent change in the output of a radiation thermometer.

When the microcomputer 22b starts the program shown in FIG. 12, a step S30 activates the drive unit 27 to rotate the galvano mirror 14 in such a manner that a position of the semiconductor substrate 3 not showing the transmitted light from the infrared lamp 6, namely a non-central position of the substrate in this case, is conjugate with the light receiving face of the radiation thermometer, thereby realizing a first state in which the infrared light from a first area of the substrate not irradiated by the measuring infrared light is detected. Then a step S31 stores $N_i$ corresponding to the spectral luminance of the substrate 3 for example at a timing $t_{100}$ shown in FIG. 13, in the same manner as in the step S6. FIG. 13 is a chart showing the output of the radiation thermometer in the ordinate, as a function of the scanning time of the galvano meter in the abscissa.

Then the drive unit 27 is activated to rotate the galvano meter 14 in such a manner that a position on the substrate 3 providing the transmitted light from the measuring infrared lamp 6, namely the central portion of the substrate 3, is conjugate with the light receiving face of the radiation thermometer, thereby realizing a second state in which the infrared light from a second area of the semiconductor substrate irradiated by the measuring infrared light is detected. This irradiating infrared light is transmitted by the substrate 3, with a proportion dependent on the doping concentration, activation state of implanted ions and temperature. Therefore, for example at a timing $t_{110}$ shown in FIG. 13, the transmitted light and the emission from the substrate 3 enter the radiation thermometer 10 to obtain a synthesized output $N_i'$, which is stored by the microcomputer 22b in the same manner as in the step S8.

As explained in the foregoing, the steps S30 and S31 provide data $N_i$ of the first state in which the infrared light is detected from the first area of the semiconductor substrate not irradiated by the measuring infrared light, while the steps S32 and S33 provide data $N_i'$ of the second state in which the infrared light is detected from the second area of the substrate irradiated by the measuring infrared light, but steps S30, S31 and steps S32, S33 may be interchanged in sequence.

Since the transmissivity of the semiconductor substrate is calculated from the difference of $N_i$ and $N_i'$ according to the equation (6), $N_i$ and $N_i'$ should be measured at positions of the same temperature (same radiation intensity), and, in consideration of the inevitable temperature distribution in the substrate, $N_i$ and $N_i'$ should be measured at positions as mutually close as possible.

In the foregoing embodiment, the galvano mirror for light path switching is used not only for measuring the transmissivity of the semiconductor substrate but also for measuring the temperature of the entire substrate. However the emissivity at the measuring point of transmissivity may be applied to the entire substrate if the temperature and the carrier concentration do not show significant fluctuation over the substrate. Also the galvano mirror may be so constructed as to scan the entire surface of the semiconductor substrate, thereby enabling temperature measurement over the entire substrate.

Figure 14:
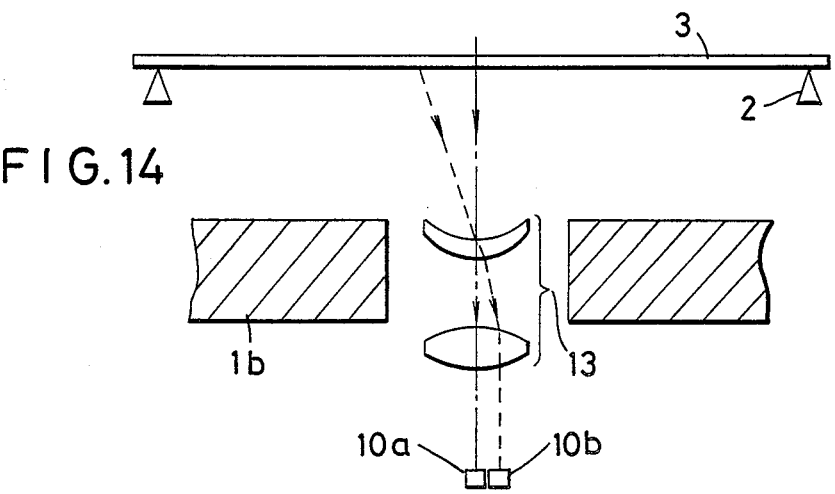
FIG. 14 is a partial schematic view of an improvement of the third embodiment.
Figure 15:
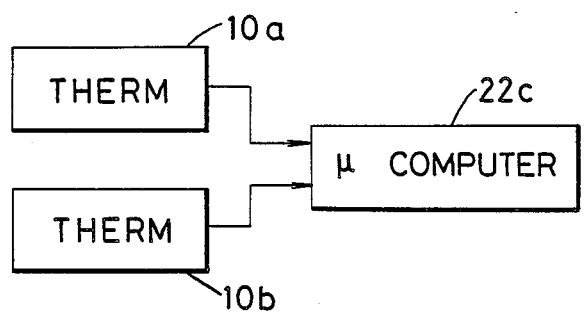
FIG. 15 is a partial block diagram of an improvement of the third embodiment.

In addition, the galvano mirror 14 in the foregoing embodiment may be replaced, as shown in FIG. 14, by two radiation thermometers 10a, 10b positioned on a conjugate with the semiconductor substrate with respect to the measuring optical system, wherein the first radiation thermometer 10a realizes the second state for detecting the infrared light from an area involving the measuring infrared light, namely while the second rediation thermometer 10b realizes the first state for detecting the infrared light from an area not involving the measuring infrared light. A microcomputer 22c shown in FIG. 15 determines the emissivity of the semiconductor substrate from the measurements of emissivities in these two states, thereby determining the temperature. The microcomputer 22c functions according to the flow chart shown in FIG. 12, wherein the step S30 reads the output of the radiation thermometer 10a, and the step S31 reads that of the radiation thermometer 10b.

Figure 16:
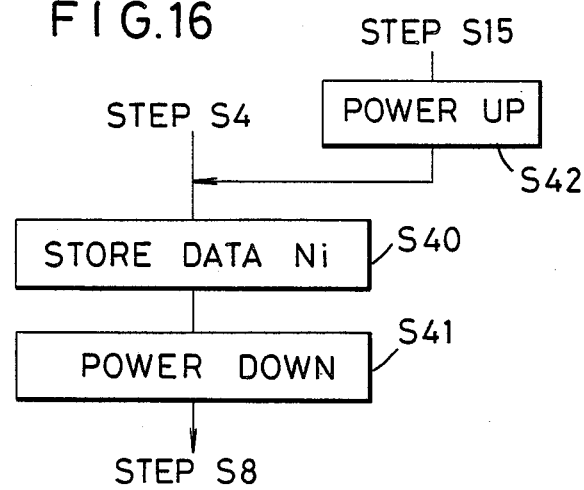
FIG. 16 is a flow chart showing a part of the function of an improvement of the first embodiment of the present invention.

In the first embodiment of the present invention, the amount of infrared light irradiating the substrate is controlled by the chopper 8 at the reading of the outputs $N_i$, $N_i'$ of the radiation thermometer, but there can be considered an improvement in which the electric power supplied to the lamp 6 is controlled by a controlling circuit 24 to achieve an effect similar to that of the chopper 8. FIG. 16 shows a part of the function of such improvement on the first embodiment. The function not appearing in FIG. 16 is the same as that shown in FIG. 3.

Referring to FIG. 16, a step S40 is executed, after the step S4, to store the data $N_i$ in the internal memory of the microcomputer, then a step S41 reduces the electric power supplied to the lamp 6, and the step S8 stores the data $N_i'$. When the internal counter is stepped up by one in the step S15, a step S42 increases the electric power, supplied to the lamp 6, to a level the same as that in the step S1.

What is claimed is:

1. An apparatus for detecting the temperature of a substrate, comprising:
   (a) support means for supporting said substrate;
   (b) irradiation means for irradiating said substrate, supported by said support means, with infrared light;
   (c) control means for controlling the irradiation of infrared light by said irradiation means onto said substrate;
   (d) intensity detection means positioned opposite to said irradiation means with respect to said substrate supported by said support means, and adapted to detect the intensity of infrared light from said substrate, thereby generating an output corresponding to the intensity of thus detected infrared light; and
   (e) temperature detection means for detecting the temperature of said substrate, on the basis of a first output of said intensity detection means when said substrate is irradiated by the infrared light from said irradiation means and a second output of said intensity detection means when said substrate is not irradiated by the infrared light from said irradiation means.

2. An apparatus according to claim 1 further comprising heating means for heating said substrate, and control means for controlling said heating means in response to the temperature detected by said temperature detection means.

3. An apparatus according to claim 1, further comprising heating means for heating said substrate by a radiation applied to said substrate, wherein said intensity detection means comprises filter means for transmitting the infrared light of a predetermined wavelength.

4. An apparatus according to claim 1, wherein said temerature detection means is adapted to detect the activation of said substrate, on the basis of the difference of said first and second outputs.

5. An apparatus according to claim 1, wherein said temperature detection means comprises means for calculating the difference of said first and second outputs, and temperature calculation means for calculating the temperature of said substrate from thus calculated difference.

6. An apparatus according to claim 5, wherein said temperature calculation means is adapted to calculate the transmissivity and emissivity of said substrate in the infrared light from said calculated difference, and to calculate the temperature of said substrate from thus calculated transmissivity and emissivity.

7. An apparatus according to claim 1, wherein said control means comprises inhibition means for intercepting the infrared light from said irradiation means to said substrate, thereby inhibiting the irradiation of said substrate with the infrared light by said irradiation means.

8. An apparatus according to claim 7, wherein said inhibition means comprises chopper means for intercepting the infrared light from said irradiation means to said substrate.

9. An apparatus for detecting the temperature of a substrate, comprising:
   (a) support means for supporting said substrate;
   (b) irradiation means for irradiating a predetermined area of said substrate, supported by said support means, with infrared light;
   (c) intensity detection means positioned opposite to said irradiation means with respect to said substrate supported by said support means, and adapted to detect the intensity of infrared light from said predetermined area and that of infrared light from an area of said substrate different from said predetermined area, thereby generating outputs corresponding to the detected intensities of infrared lights; and said predetermined area and that of infrared light from an area of said substrate different from said predetermined area, thereby generating outputs corresponding to the detected intensities of infrared light; and
   (d) temperature detection means for detecting the temperature of said substrate, on the basis of a first output of said intensity detection means corresponding to the infrared light from said predetermined area and a second output corresponding to the infrared light from said another area.

10. An apparatus according to claim 9, wherein said intensity detection means comprises two intensity detecting elements for generating outputs corresponding to the intensities of radiations, and means for guiding the infrared light from said predetermined area to one of said two intensity detecting elements and guiding the infrared light from an area of said substrate different from said predetermined area to the other of said two intensity detecting elements.

11. An apparatus according to claim 9, wherein said temperature detection means comprises means for calculating the difference of said first and second outputs, and means for calculating the temperature of said substrate, on the basis of thus calculated difference.

12. An apparatus according to claim 9, wherein said temperature detection means is adapted to calculate the transmissivity and the emissivity of said substrate in the infrared light and to calculate the temperature of said substrate, on the basis of thus calculated transmissivity and emissivity.

13. An apparatus according to claim 9, further comprising heating means for heating said substrate, and control means for controlling said heating means in response to the temperature detected by said temperature detection means.

14. An apparatus according to claim 9, further comprising heating means for heating said substrate by irradiating said substrate with infrared light, wherein said intensity detection means comprises filter means for transmitting infrared light of a predetermined wavelength.

15. An apparatus according to claim 9, wherein said intensity detection means comprises an intensity detecting element for generating an output corresponding to the intensity of the infrared light, and selection means for guiding the infrared light from said predetermined area and the infrared light from an area of said substrate different from said predetermined area selectively to said intensity detection element.

16. An apparatus according to claim 15, wherein said selection means comprises a galvano mirror and means for driving said galvano mirror.

17. A method of detecting the temperature of a substrate, comprising steps of:
(a) supporting said substrate;
(b) applying, to said substrate, irradiation means for irradiating said supported substrate with infrared light and intensity detection means positioned opposite to said irradiation means with respect to said supported substrate and adapted to detect the intensity of infrared light from said substrate thereby generating an output corresponding to the detected intensity of the infrared light; and
(c) detecting the temperature of said substrate, on the basis of an output of said intensity detection means when said substrate is irradiated by the infrared light from said irradiation means and an output of said intensity detection means when said substrate is not irradiated by the infrared light from said irradiation means.

18. A method according to claim 17, wherein said temperature detecting step comprises a step for calculating the difference between the output of said intensity detection means when said substrate is irradiated by a radiation and the output of said intensity detection means when said substrate is not irradiated by the infrared light.

19. A method according to claim 18, wherein said temperature detecting step comprises a step for calculating the transmissivity of said substrate in the infrared region based on said calculated difference, and a step for detecting the temperature of said substrate based on thus calculated transmissivity.

20. A method for detecting the temperature of a substrate, comprising steps of:
(a) supporting a substrate;
(b) applying, to said substrate, irradiation means for irradiating a predetermined area of said supported substrate with infrared light, and intensity detection means positioned opposite to said irradiation means with respect to said supported substrate and adapted to detect the intensity of infrared light from said substrate and to generate an output corresponding to the detected intensity of the infrared light;
(c) guiding the infrared light from said predetermined area and the infrared light from an area of said substrate different from said predetermined area to said intensity detection means; and
(d) detecting the temperature of said substrate, based on an output of said intensity detection means corresponding to the infrared light from said predetermined area, and an output corresponding to the infrared light from the area of said substrate different from said predetermined area.

21. An apparatus comprising;
(a) support means for supporting a substrate;
(b) annealing means for annealing the substrate supported by said support means;
(c) irradiation means for irradiating the substrate, supported by said support means, with a radiation;
(d) means for detecting the intensity of the radiation from said irradiation means transmitted by said substrate and generating a detection signal corresponding to the detected intensity; and
(e) control means for controlling said annealing means in response to said detection signal.

22. An apparatus for detecting the temperature of a substrate, comprising;
(a) support means for supporting a substrate;
(b) irradiation means for irradiating said substrate, supported by said support means, with a radiation;
(c) intensity detection means for detecting the intensity of the radiation coming from said irradiation means and transmitted by said substrate and generating an output corresponding to the detected intensity of the radiation; and
(d) temperature detection means for detecting the temperature of said substrate, on the basis of the output of said intensity detection means.

23. An apparatus for detecting the temperature of a substrate, comprising;
(a) support means for supporting said substrate;
(b) irradiation means for irradiating a predetermined area of said substrate supported by said support means with infrared light;
(c) intensity detection means positioned opposite to said irradiation means with respect to said substrate supported by said support means and adapted to detect the intensity of the infrared light from said predetermined area and the intensity of the infrared light from an area of said substrate different from said predetermined area and to generate outputs corresponding to the detected intensities of the infrared lights; and (d) temperature detection means for detecting the temperature of said substrate, on the basis of a first output of said intensity detection means corresponding to the infrared light from said predetermined area, and a second output corresponding to the infrared light from an area different from said predetermined area.

* * * * *